(12) United States Patent
Suganuma et al.

(10) Patent No.: US 9,031,715 B2
(45) Date of Patent: May 12, 2015

(54) CONTROL DEVICE

(75) Inventors: Hideaki Suganuma, Yokohama (JP); Takeshi Gotoh, Tokyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/805,850

(22) PCT Filed: Jun. 22, 2011

(86) PCT No.: PCT/JP2011/064310
§ 371 (c)(1),
(2), (4) Date: Dec. 20, 2012

(87) PCT Pub. No.: WO2012/002231
PCT Pub. Date: Jan. 5, 2012

(65) Prior Publication Data
US 2013/0096737 A1    Apr. 18, 2013

(30) Foreign Application Priority Data
Jun. 29, 2010 (JP) .................. 2010-147704

(51) Int. Cl.
| | | |
|---|---|---|
| *B60R 16/02* | (2006.01) | |
| *G05D 1/00* | (2006.01) | |
| *G01C 21/00* | (2006.01) | |
| *G06F 9/445* | (2006.01) | |
| *G06F 17/00* | (2006.01) | |
| *G06Q 10/00* | (2012.01) | |

(52) U.S. Cl.
CPC .................. *B60R 16/02* (2013.01); *G06F 17/00* (2013.01); *G01C 21/00* (2013.01); *G05D 1/00* (2013.01); *G06F 8/65* (2013.01); *G06Q 10/20* (2013.01)

(58) Field of Classification Search
CPC ................................. B60R 16/02; G06F 8/68
USPC ............................................................ 701/2
See application file for complete search history.

(56) References Cited

U.S. PATENT DOCUMENTS

| | | | |
|---|---|---|---|
| 8,457,888 B2* | 6/2013 | Ranford ....................... 701/465 |
| 2008/0148268 A1 | 6/2008 | Hirouchi |
| 2009/0089777 A1 | 4/2009 | Fuller et al. |
| 2009/0326991 A1* | 12/2009 | Wei et al. ........................ 705/5 |
| 2010/0082559 A1 | 4/2010 | Sumcad et al. |
| 2010/0179844 A1* | 7/2010 | LaFergola et al. ................ 705/7 |
| 2010/0332125 A1* | 12/2010 | Tan et al. ...................... 701/207 |
| 2012/0065834 A1* | 3/2012 | Senart et al. ................. 701/31.4 |
| 2012/0254763 A1* | 10/2012 | Protopapas et al. .......... 715/738 |
| 2013/0238167 A1* | 9/2013 | Stanfield et al. .................. 701/2 |

FOREIGN PATENT DOCUMENTS

| | | |
|---|---|---|
| JP | A-2004-38616 | 2/2004 |
| JP | 2004192278 A  * | 7/2004 |
| JP | A-2004-192278 | 7/2004 |

(Continued)

*Primary Examiner* — Fadey Jabr
*Assistant Examiner* — Yazan A Soofi
(74) *Attorney, Agent, or Firm* — Oliff PLC (57) ABSTRACT

Disclosed is a control device that changes control content of control means mounted in a vehicle, including: schedule acquisition means for acquiring a schedule relating to the vehicle; and change date and time generation means for estimating a time when the vehicle is not in use on the basis of the schedule acquired by the schedule acquisition means, and for generating and outputting change date and time when the control content is changed, according to the time.

10 Claims, 9 Drawing Sheets

(56) References Cited

FOREIGN PATENT DOCUMENTS

| | | | |
|---|---|---|---|
| JP | 2008152482 A * | 7/2008 | |
| JP | A-2008-152482 | 7/2008 | |
| JP | A-2008-269479 | 11/2008 | |
| JP | A-2009-271603 | 11/2009 | |
| JP | A-2011-53954 | 3/2011 | |
| WO | WO 02/071266 A1 | 9/2002 | |

* cited by examiner

| USER ID | BUSINESS TITLE | PLACE | TIME | BUSINESS TYPE |
|---|---|---|---|---|
| 0001 | BUSINESS MEETING | CONFERENCE ROOM | 9:00~11:00 | IMPORTANT |
| 0002 | BUSINESS TRIP (IN MOTION) | SHINKANSEN | 8:00~11:00 | BUSINESS |
| 0003 | BUSINESS TABLE | RESTAURANT | 12:00~13:00 | PRIVATE |
| ... | ... | ... | ... | ... |

Fig.3

| VEHICLE ID | CAR MODEL | USAGE | BUSINESS TITLE | STORAGE PLACE |
|---|---|---|---|---|
| 0001 | COMPANY CAR | WORK | BUSINESS TRIP | OUTDOOR PARKING AREA |
| 0002 | COMMECIAL CAR | TRANSPORTATION | BUSINESS MEETING | INDOOR PARKING AREA |
| 0003 | RV | LEISURE | PRIVATE | OUTDOOR PARKING AREA |
| ... | ... | ... | ... | ... |

CONTROL DEVICE

TECHNICAL FIELD

The present invention relates to a control device that changes control content of control means mounted in a vehicle.

BACKGROUND ART

In the related art, a technique has been proposed that a program for controlling a device mounted inside a vehicle is updated. For example, in a vehicle-mounted gateway device disclosed in Patent Literature 1 mentioned below, if a program is received from a server, a program that is previously stored in the vehicle-mounted gateway device is updated into the received program.

CITATION LIST

Patent Literature

[Patent Literature 1] Japanese Unexamined Patent Application Publication No. 2004-192278

SUMMARY OF INVENTION

Technical Problem

However, in a case where a program of an ECU (Electronic Control Unit) (control means) is updated, according to the update content of the program, there are cases where it is necessary to stop a vehicle while the program is being updated. However, a time when the vehicle is stopped in order to update the program is different for each user. Thus, in a case where the update date and time of the program is set in advance, there are cases where a user cannot update the program at the set update date and time. It is preferable that important programs be updated earlier. To this end, it is necessary to generate an update date and time of the program according to circumstances of a user who owns the vehicle, that is, a usage situation of the vehicle.

An object of the invention is to provide a control device that is able to generate a change date and time of the control content of control means according to a usage situation of a vehicle.

Solution to Problem

According to an aspect of the invention, there is provided a control device that changes control content of control means mounted in a vehicle, including: schedule acquisition means for acquiring a schedule relating to the vehicle; and change date and time generation means for estimating a time when the vehicle is not in use on the basis of the schedule acquired by the schedule acquisition means, and for generating and outputting change date and time when the control content is changed, according to the time.

In this control device, the schedule relating to the vehicle is acquired, and a time when the vehicle is not in use is estimated on the basis of the acquired schedule to generate an update date and time for output. By acquiring the schedule relating to the vehicle in this way, it is possible to estimate a time when the vehicle is not in use, that is, a usage situation of the vehicle. Thus, it is possible to generate a change schedule of the control content according to the usage situation of the vehicle.

Preferably, the schedule acquisition means acquires the schedule from a terminal outside the vehicle. In this case, it is possible to acquire a schedule of a user who owns the vehicle from a scheduler of an external terminal such as a mobile phone or a personal computer, and thus, it is possible to appropriately understand the usage situation of the vehicle.

Preferably, the schedule is an activity plan of a user who owns the vehicle. In this case, by acquiring the activity plan of the user who owns the vehicle, it is possible to estimate the date and time when the vehicle is not in use (date and time when the vehicle is in use). Thus, it is possible to appropriately generate a change date and time of the control content of the control means according to a situation of the user who owns the vehicle.

Preferably, the schedule includes at least one of a usage situation, a usage environment and a usage plan of the vehicle. In this case, in a case where the vehicle is managed by a corporation, for example, in a case of a company car or a rental car, by acquiring a usage situation or a rental situation of the vehicle, it is possible to estimate the date and time when the vehicle is not in use. Thus, it is possible to appropriately generate a change date and time of the control content of the control means according to a situation of the user who owns the vehicle.

Preferably, the control means is an electronic control unit, and the change date and time generation means estimates the time when the vehicle is not in use on the basis of the schedule acquired by the schedule acquisition means and generates, for outputting, change date and time when a program of the electronic control unit is changed, according to the time. According to this configuration, it is possible to generate a change date and time of the program of the electronic control unit (ECU) according to the usage situation of the vehicle.

Advantageous Effects of Invention

According to the invention, it is possible to generate a change date and time of the control content of the control means according to the usage situation of the vehicle.

DESCRIPTION OF EMBODIMENTS

Hereinafter, exemplary embodiments will be described with reference to the accompanying drawings. In the following description, same reference numerals are given to the same elements or elements having the same functions, and repeated description thereof will be omitted.

Figure 1:
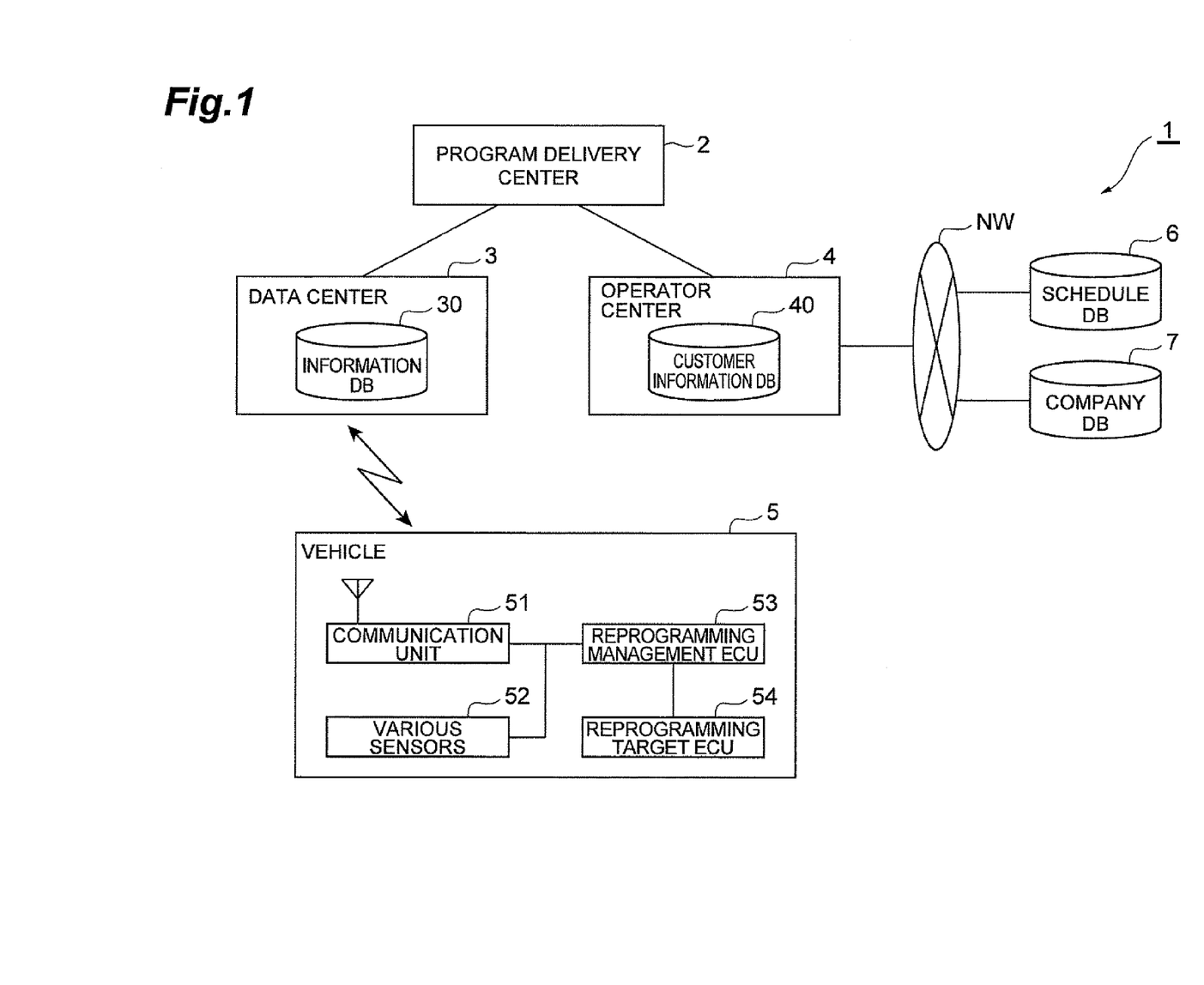
FIG. 1 is a diagram illustrating a configuration of a program update system that includes a program delivery center which is a control device according to an exemplary embodiment of the invention.

FIG. 1 is a diagram illustrating a configuration of a program update system that includes a program delivery center which is a control device according to an exemplary embodiment of the invention. As illustrated in FIG. 1, a program update system 1 includes a program delivery center 2, a data center 3, an operator center 4, and a vehicle 5. The program delivery center 2, the data center 3, and the operator center 4 are connected to each other for communication through a network.

The data center 3 is managed by an automobile manufacturer, for example, and performs guidance or instruction at the time of program update (hereinafter, reprogramming), and program addition and removal which are a change in control content of a reprogramming target ECU (Electronic Control Unit) 54 (described later) which is an electronic control device (control means) included in the vehicle 5 such as an automobile. The data center 3 includes an information DB (database) 30 in which various data relating to the vehicle 5 is stored. An information DB 30 includes a vehicle information DB in which vehicle information relating to the vehicle 5 is stored, a maintenance record DB in which information relating to a maintenance history of the vehicle 5 is stored, a driver learning DB in which driver learning information such as driving characteristics of a driver is stored, and a navigation settings information DB in which navigation settings information relating to the settings (home settings or the like) of a navigation system installed in the vehicle 5 is stored. Further, the data center 3 manages customer information specified from the driver learning information and the navigation settings information.

Further, the data center 3 sets a reprogramming guidance method to a user, on the basis of the data stored in the information DB 30 provided therein. Specifically, the data center 3 sets the reprogramming guidance method to the user on the basis of characteristic information (gender, age, navigation system usage conditions, reprogramming frequency or the like) about a user of the vehicle 5. As the program update guidance method, there is a method of directly notifying the user of an update procedure through an operator of the operator center 4 with a reprogramming notification only (user performs update according to guidance).

Further, the data center 3 transmits data output from the program delivery center 2 or the operator center 4 to the vehicle 5, and also transmits data transmitted from the vehicle 5 to the program delivery center 2 and the operator center 4.

The operator center 4 is a center where an operator is present and supports the management or monitoring of reprogramming executed in each vehicle 5. The operator center 4 has a data communication function and performs transmission and reception of data with the data center 3. Accordingly, the data communication between the operator center 4 and the vehicle 5 is performed by the data center 3.

If the operator center 4 receives the reprogramming data (start plan time of reprogramming, processing time, vehicle stopping position or the like) transmitted from the program delivery center 2, the operator center 4 determines whether it is possible to secure an operator while reprogramming is being performed on the basis of the reprogramming data, and transmits information about the operator securing to the program delivery center 2. Here, in a case where an operator can be secured, it is assumed that the operator is standing by before the start plan time. At this time, the operator center 4 connects to the reserved vehicle 5, and notifies a driver that reprogramming will be performed under the monitoring of an operator who is in the vicinity of a destination. Further, if automatic connection is performed from a reprogramming management ECU 53 of the reserved vehicle 5 to the operator center 4, the operator who stands by handles the automatic connection in the operator center 4.

Further, the operator center 4 includes a customer information DB 40. In the customer information DB 40, customer information related to the vehicle information in the vehicle information DB of the data center 3 is stored. Further, the operator center 4 is connected to a schedule DB 6 and a company DB 7 through a network NW. The schedule DB 6 and the company DB 7 are database servers which are shared on the network, for example.

Figure 2:
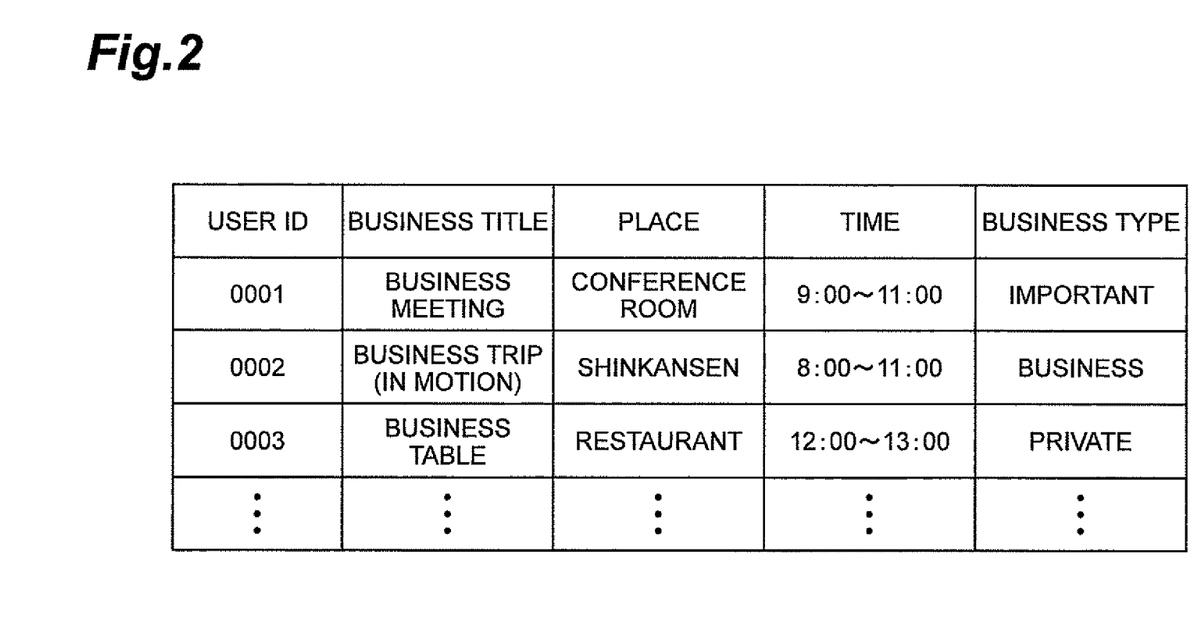
FIG. 2 is a diagram illustrating an example of a table in which data relating to a schedule of an individual user is stored.

The schedule DB 6 is a database in which an individual schedule of a user who owns the vehicle 5 is stored. In the schedule DB 6, a schedule input to a scheduler by an external terminal of the vehicle 5 such as a personal computer, a mobile phone or a PDA (Personal Digital Assistant) of an individual user is stored. Coordination of the scheduler of the user and the schedule DB 6 is performed by registration of the user. FIG. 2 is a diagram illustrating an example of a table in which data relating to a schedule of an individual user is stored. As illustrated in FIG. 2, "user ID", "business title", "place", "time" and "business type" related to the customer information are stored in the schedule DB 6 to be matched with each other.

Figure 3:
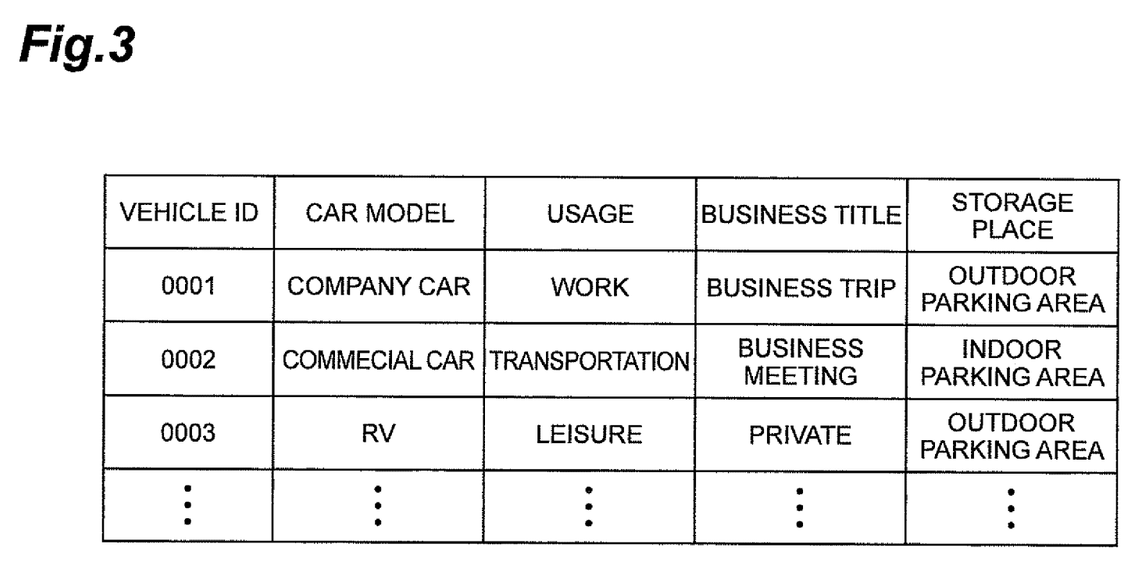
FIG. 3 is a diagram illustrating an example of a table in which data relating to a schedule of a corporate user is stored.
Figure 4:
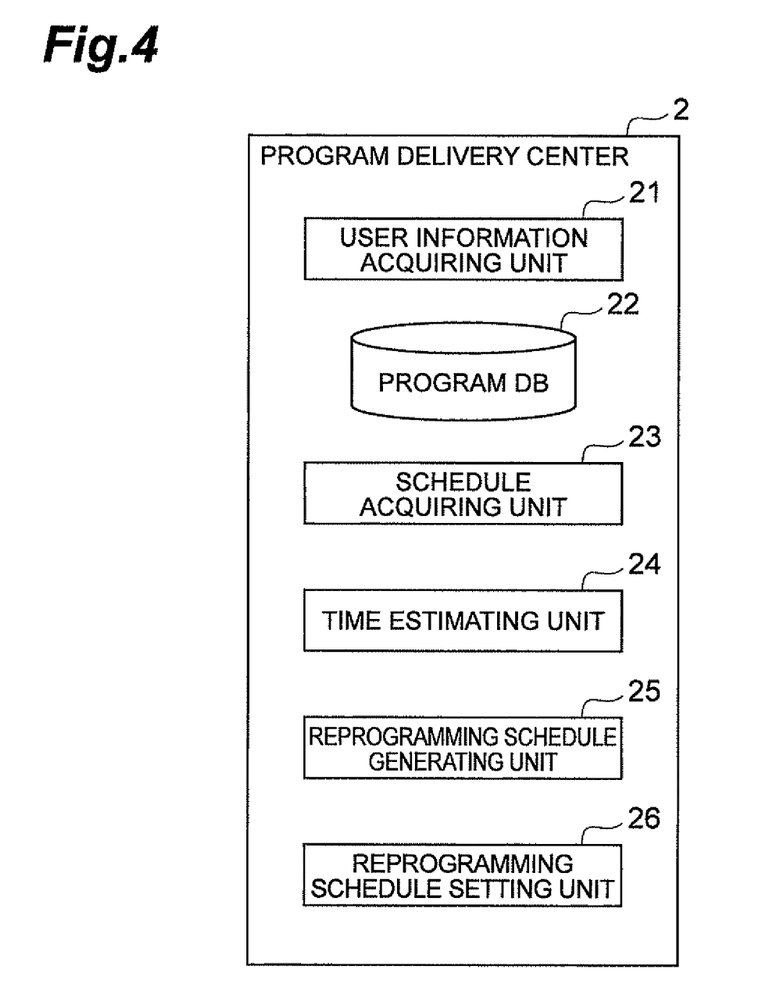
FIG. 4 is a diagram illustrating a configuration of the program delivery center.

The company DB 7 is a database (vehicle management system) in which a schedule of a company, a rental car company or the like which owns company cars and commercial cars is stored. In the company DB 7, a schedule input to a scheduler by a personal computer of a corporate user, or a mobile phone, a PDA or the like of an owner who owns a vehicle is stored. FIG. 3 is a diagram illustrating an example of a table in which data relating to a schedule of a corporate user is stored. As illustrated in FIG. 4, "vehicle ID", "vehicle type", "usage", "business title", "storage site" related to the customer information are stored in the company DB 7 to be matched with each other.

The program delivery center 2 is a program update device (control device) which updates and manages a program of the reprogramming target ECU 54 by remote control. As illustrated in FIG. 4, the program delivery center 2 includes a user information acquiring unit 21, a program management DB 22, a schedule acquiring unit (schedule acquisition means) 23, a time estimating unit 24, a reprogramming schedule generating unit (update date and time generation means) 25, and a reprogramming schedule setting unit 26. The program delivery center 2 includes a data communication function, and performs transmission and reception with the data center 3. Accordingly, data communication between the program delivery center 2 and the vehicle 5 is performed through the data center 3. The program update device which is the program delivery center 2 is a server device that includes a CPU (Central Processing Unit), a ROM (Read Only Memory), a RAM (Random Access Memory), a communication module, and the like.

The user information acquiring unit 21 is a unit that acquires information on a user who owns a vehicle in which a program should be updated. If an update program is newly stored in the program management DB 22 that manages a program of an electronic control device according to a business operator or the like who supports each vehicle 5, the user information acquiring unit 21 acquires information relating to the user of the vehicle in which the program should be updated. Specifically, the user information acquiring unit 21 transmits a registration information acquisition request to the data center 3, and acquires vehicle information relating to a car model, a year model and a car serial number from information indicating a target vehicle included in the update program. If the user information acquiring unit 21 acquires the vehicle information, the user information acquiring unit 21 transmits a customer information acquisition request to the operator center 4, and acquires user information (customer information) indicating the owner name or the like of the vehicle related to the vehicle information. The user information acquiring unit 21 outputs the acquired user information relating to the vehicle in which the program should be updated to the schedule acquiring unit 23.

The schedule acquiring unit 23 is a unit that acquires a schedule relating to the vehicle 5. If the schedule acquiring unit 23 receives the user information output from the user information acquiring unit 21, the schedule acquiring unit 23 acquires a schedule of the user who owns the vehicle, in a case where the schedule of the user indicated by the user information is cooperated with the schedule DB 6 and the company DB 7. Specifically, the schedule acquiring unit 23 acquires the schedule of the user from the schedule DB 6 or the company DB 7 on the basis of the user information. In a case where the user is an individual, the schedule of the user corresponds to an individual activity plan (for example, business trip, meeting or the like) of the user who owns the vehicle 5, and in a case where the user is a corporation, the schedule corresponds to a schedule of an owner who owns the car, a management situation of the vehicle, a usage situation and a reservation situation of a rental car, or the like. The schedule acquiring unit 23 outputs schedule information indicating the acquired schedule relating to the vehicle to the time estimating unit 24 and the reprogramming schedule generating unit 25.

The time estimating unit 24 is a unit that estimates a time when the vehicle 5 is not in use from the schedule of the user. If the schedule information output from the schedule acquiring unit 23 is received, the time estimating unit 24 estimates a time when the vehicle is not in use on the basis of the schedule information. Specifically, the time estimating unit 24 determines whether there is a plan in a reprogramming candidate time that is set in advance. If there is the plan in the candidate time, the time estimating unit 24 estimates whether the time in the candidate time is the time when the vehicle 5 is not in use. The time estimating unit 24 performs a process such as a fuzzy retrieval or a behavior interpolation estimation, to extract a plan such as "business meeting" or "business trip", for example, and to acquire the planned time.

More specifically, in the case of an individual user, as illustrated in FIG. 2, for example, in schedule information about a user (for example, user ID: 0001) who uses a vehicle for commuting everyday (which is estimated from the previous accumulated information), in a case where a plan of "business meeting (place: work place (conference room))" is in the schedule, the time estimating unit 24 considers that the user is present in the conference room of the work place at the time of the business meeting and the vehicle is not likely to be used, and estimates a corresponding time (9:00 to 11:00) as a time when the vehicle is not in use. Further, for example, in schedule information about a user who only uses a vehicle (which is estimated from the previous accumulated information) and lives in Tokyo (user ID: 0002), in a case where a plan of "domestic business trip (place: Nagoya)" is in the schedule, the time estimating unit 24 considers that the vehicle is not likely to be used in motion on the Shinkansen, and estimates a corresponding time (8:00 to 11:00) as a time when the vehicle is not in use.

Further, in the case of a corporation or a rental car company, the time estimating unit 24 determines whether vehicle 5 is parked at a location which cannot be reached by electric waves (for example, an indoor (underground) parking area) on the basis of a storage site (see FIG. 3) of the schedule information. In a case where it is determined that the vehicle 5 is parked at a location which cannot be reached by electric waves, the time estimating unit 24 estimates a time during which electric waves will not reach the vehicle from the schedule information. The time estimating unit 24 outputs time information indicating the estimated time to the reprogramming schedule generating unit 25.

The reprogramming schedule generating unit 25 is a unit that generates and outputs a reprogramming schedule for reprogramming according to the schedule of the user acquired by the schedule acquiring unit 23 and the time estimated by the time estimating unit 24. In the case of an individual user, if the time information output from the time estimating unit 24 is received, the reprogramming schedule generating unit 25 generates the time indicated by the time information as the reprogramming schedule.

Further, in the case of a corporate user, since the corporate user may own plural vehicles, if time information is received from the time estimating unit 24, the reprogramming schedule generating unit 25 generates a reprogramming schedule according to which programming of the plural vehicles can be intensively performed in a short time. Further, the reprogramming schedule generating unit 25 generates the reprogramming schedule in preferential consideration of the time and date (day of the week) when it is considered that usage frequency is low, according to car model and usage (schedule information). Specifically, in a case where the vehicle is a company car, the reprogramming schedule generating unit 25 reduces the priority of the reprogramming candidate schedule during the daytime on weekdays when the usage frequency is high, and in a case where the vehicle is a rental car for leisure, the reprogramming schedule generating unit 25 reduces the priority of the reprogramming candidate schedule on weekends and in season, to generate the reprogramming schedule. The reprogramming schedule generating unit 25 transmits (outputs) reprogramming schedule information indicating the generated reprogramming schedule to the data center 3. The data center 3 that receives the reprogramming schedule information transmits the reprogramming schedule information to the vehicle 5.

The reprogramming schedule setting unit 26 is a unit that sets reprogramming schedule, in a case where there is a response indicating acceptance from a user with respect to the reprogramming schedule transmitted to the user. In a case where response information indicating the acceptance of the reprogramming schedule is received from the vehicle 5 through the data center 3 after the reprogramming schedule is output from the reprogramming schedule generating unit 25, the reprogramming schedule setting unit 26 sets a reprogramming schedule based on the proposed reprogramming schedule. Further, in a case where the vehicle 5 is parked at a location which cannot be reached by electric waves, the reprogramming schedule setting unit 26 performs settings so as to perform download of a program for update while the vehicle is being used. The reprogramming schedule setting unit 26 transmits a reprogramming data indicating the set reprogramming schedule to the operator center 4.

The vehicle 5 includes a communication unit 51, a sensor 52, a reprogramming management ECU 53, and a reprogramming target ECU 54. The communication unit 51 is a unit that performs transmission and reception with the data center 3, and receives data transmitted from the data center 3 and outputs the data to the reprogramming management ECU 53 and also transmits data output from the reprogramming management ECU 53 to the data center 3.

The sensor 52 acquires biological information or information about a seat position or the like. The sensor 52 outputs the acquired information to the reprogramming management ECU 53.

The reprogramming management ECU 53 is a unit that generally manages a process relating to reprogramming. In the reprogramming management ECU 53, reprogramming management, reprogramming request reception, determination on whether reprogramming can be executed (determination on whether vehicle is stopped, or the like), reprogramming operation procedure notification, a process of learning and transmitting operation characteristics of a driver on the basis of the information acquired by sensor 52, and the like are performed. If the reprogramming schedule information transmitted from the program delivery center 2 is received, the reprogramming management ECU 53 displays the reprogramming schedule information on a display of a navigation system, for example (presents the reprogramming schedule information to a user). In a case where a response (accept/cancel) to the reprogramming schedule information is input through input reception means (touch panel, switch or the like) by the user after the reprogramming schedule information is presented to the user, the reprogramming management ECU 53 transmits response information indicating the response to the program delivery center 2 through the communication unit 51.

Further, in the reprogram management ECU 53, after the reprogramming is terminated by the reprogramming target ECU 54, it is determined whether the reprogramming is successful. Further, the reprogramming management ECU 53 transmits the success/failure result of the reprogramming to the operator center 4 through the data center 3.

The reprogramming target ECU 54 is an electronic control unit that is a programming update target. If an update program output from the reprogramming target ECU 53 is received, the reprogramming target ECU 54 rewrites a software program that is a reprogramming target. The reprogramming target ECU 54 is formed by using a computer that includes a CPU, a ROM and a RAM as a main body, and respective functions of the reprogramming target ECU 54 are realized by reading a program relating to control of the vehicle 5 on the ROM or the RAM and by executing the program by the CPU.

(Reprogramming Schedule Setting of Individual User)

Figure 5:
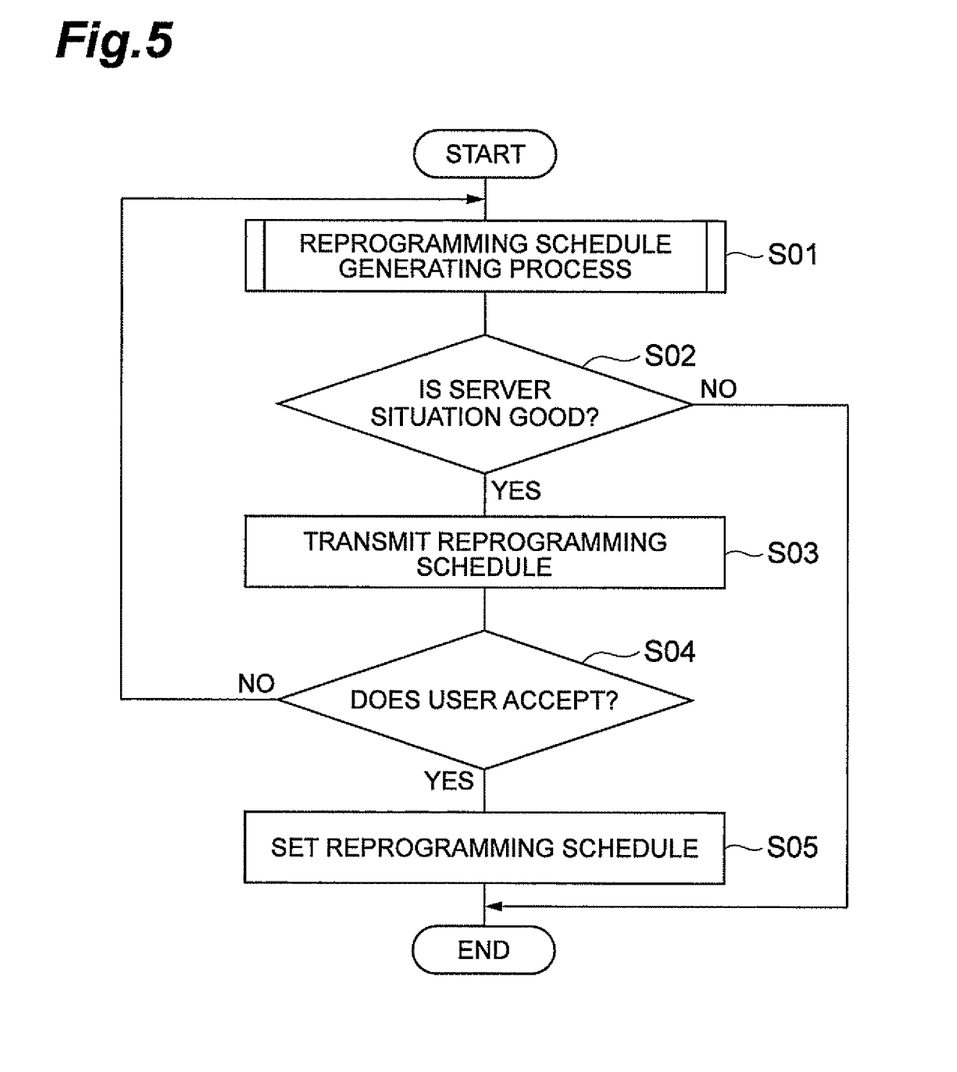
FIG. 5 is a flowchart illustrating an operation of the program delivery center.
Figure 6:
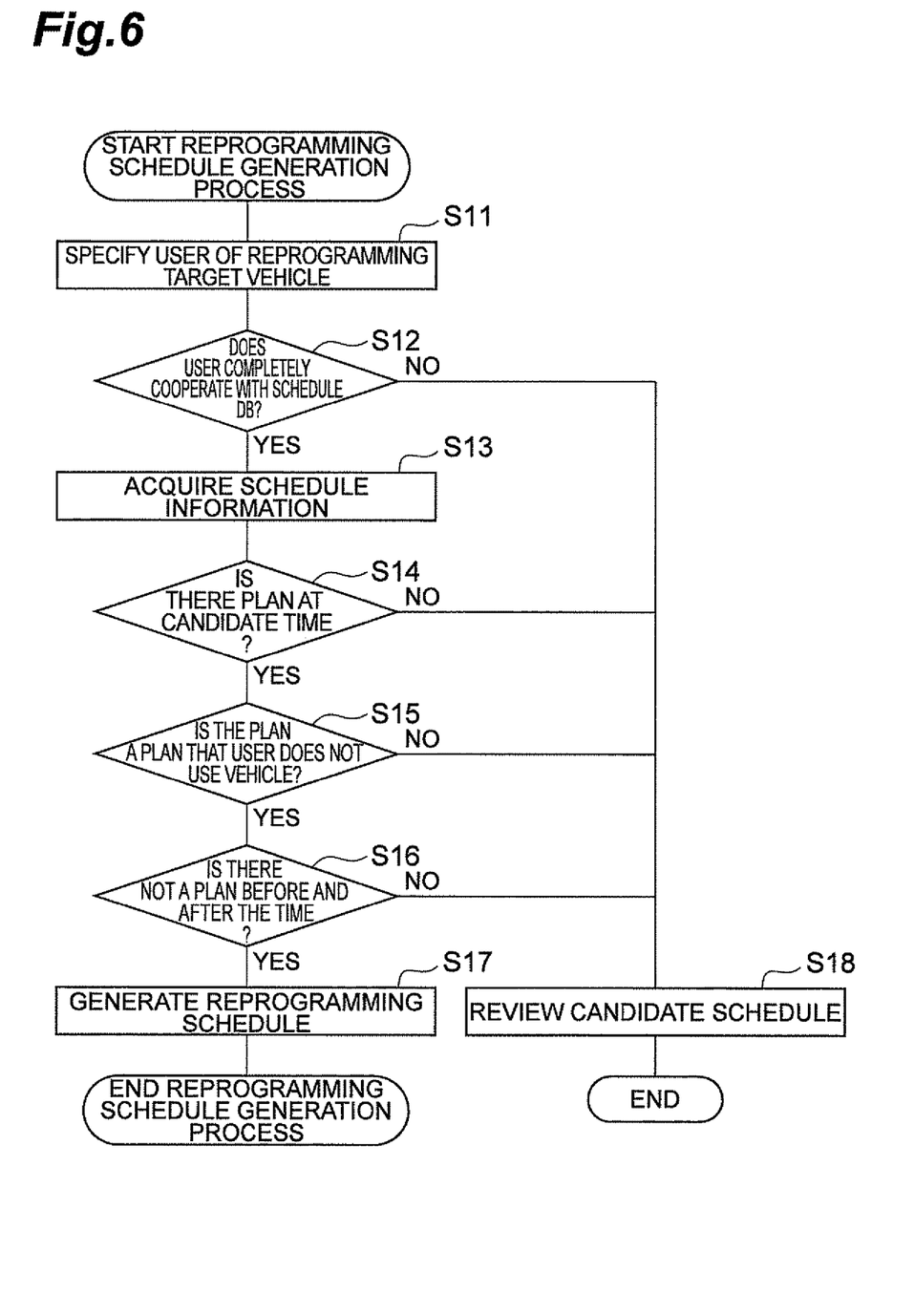
FIG. 6 is a flowchart illustrating a reprogramming schedule generation process of an individual user.

Subsequently, an operation of the program delivery center 2 will be described with reference to FIGS. 5 and 6. FIG. 5 is a flowchart illustrating an operation of a program delivery center, and FIG. 6 is a flowchart illustrating a reprogramming schedule generation process. In the following description, an example is illustrated in which a user is an individual.

As illustrated in FIG. 5, firstly, the reprogramming schedule generation process is performed (step S01).

In the reprogramming schedule generation process, as illustrated in FIG. 6, firstly, a user who owns a reprogramming target vehicle is specified by the user information acquiring unit 21 (step S11). Next, it is determined by the schedule acquiring unit 23 whether a scheduler of the specified user has coordinated with the schedule DB 6 (step S12). In a case where it is determined that the scheduler of the user has coordinated with the schedule DB 6, the procedure proceeds to step S13. On the other hand, in a case where it is determined that the scheduler of the user does not completely cooperate with the schedule DB 6, the procedure proceeds to step S18.

In step S13, the schedule of the user is acquired by the schedule acquiring unit 23. Further, it is determined whether there is a plan of the user at a preset candidate time (step S14). In a case where it is determined that there is a plan of the user, the procedure proceeds to step S15. On the other hand, in a case where it is determined that there is not the user's plan, the procedure proceeds to step S18.

In step S15, the time estimating unit 24 determines whether the user's plan is a plan in which the user will not use the vehicle 5, that is, determines the time when the vehicle 5 is not in use. In a case where it is determined that the user's plan is a plan that the user does not use the vehicle 5, the procedure proceeds to step S16. On the other hand, in a case where it is determined that the user's plan is not the plan that the user does not use the vehicle 5, the procedure proceeds to step S18.

In step S16, it is determined by the time estimating unit 24 whether there is a plan before and after the time when the vehicle 5 is not in use. In a case where it is determined that there is not a plan before and after the time when the vehicle 5 is not in use, a reprogramming schedule is generated by reprogramming schedule generating unit 25 (step S17), and the reprogramming schedule generation process is terminated. On the other hand, in a case where it is not determined that there is not a plan before and after the time when the vehicle 5 is not in use, the procedure proceeds to step S18. In step S18, a candidate schedule of the reprogramming schedule is reviewed, and the process of the program delivery center 2 is terminated.

Returning to FIG. 5, if the reprogramming schedule is generated by the reprogramming schedule generation process, it is determined whether the state of a server is favorable or not (congested or not) (step S02). In a case where it is determined that the state of the server is favorable, the reprogramming schedule is transmitted to the vehicle 5 (step S03). On the other hand, in a case where it is determined that the state of the server is not favorable, the procedure is terminated.

Subsequently, as the reprogramming schedule is transmitted to the vehicle 5, it is determined whether it is being shown that the user has accepted the reprogramming schedule in the response information transmitted from the vehicle 5 (step S04). In a case where it is determined that the user accepts the reprogramming schedule, the reprogramming schedule of the vehicle 5 is set by the reprogramming schedule setting unit 26 (step S05). On the other hand, in a case where it is determined that the user does not accept the reprogramming schedule, the procedure returns to step S01 and repeats the process.

Figure 7:
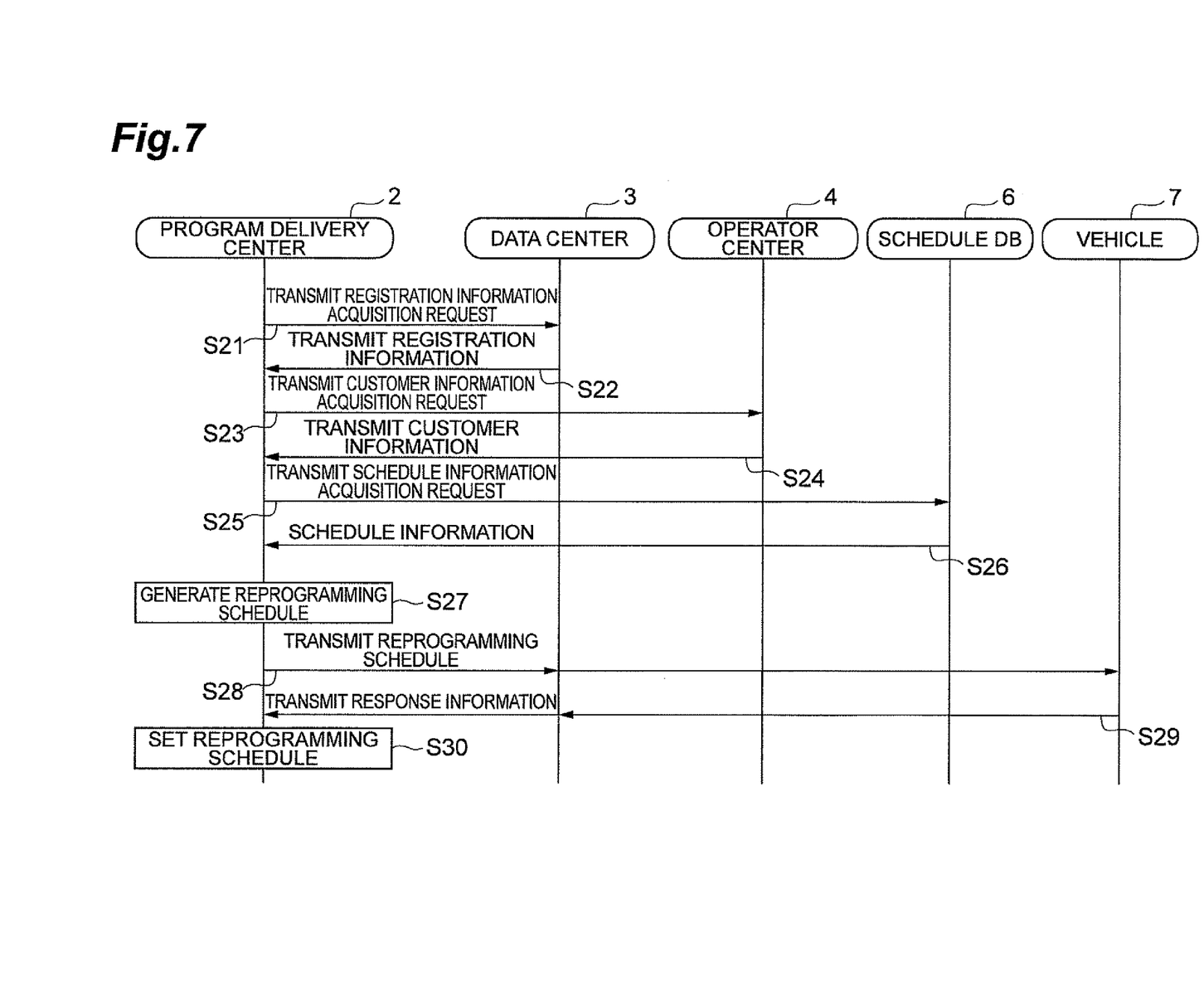
FIG. 7 is a sequence diagram illustrating a program delivery system in the case of an individual user.

Next, an operation of the program update system 1 will be described with reference to FIG. 7. FIG. 7 is a sequence diagram illustrating the operation of the program update system.

As illustrated in FIG. 7, firstly, a registration information acquisition request is transmitted to the data center 3 from program delivery center 2 (step S21). The Data center 3 that receives the registration information acquisition request transmitted from the program delivery center 2 extracts registration information such as vehicle information with reference to the information DB 30, and transmits the registration information program delivery center 2 (step S22). The program delivery center 2 that receives the registration information transmitted from the data center 3 transmits a customer information acquisition request for requesting acquisition of customer information corresponding to registration information to the operator center 4 (step S23). The operator center 4 that receives the customer information acquisition request transmitted from the program delivery center 2 extracts customer information corresponding to vehicle information with reference to the customer information DB 40, and transmits the customer information to the program delivery center 2 (step S24).

The program delivery center 2 that receives the customer information transmitted from the operator center 4 transmits the schedule information acquisition request for requesting acquisition of the user's schedule shown in the customer information to the schedule DB 6 (step S25). The schedule DB 6 that receives the schedule information acquisition request transmitted from the program delivery center 2 extracts schedule information corresponding to the user, and transmits the schedule information to the program delivery center 2 (step S26).

The program delivery center 2 that receives the schedule information transmitted from the schedule DB 6 generates a reprogramming schedule (step S27), and transmits the reprogramming schedule to the vehicle 5 through the data center 3 (step S28). The vehicle 5 that receives the reprogramming schedule transmitted from the program delivery center 2 presents the reprogramming schedule to the user, and transmits response information about whether the reprogramming schedule is available to the program delivery center 2 (step S29). The program delivery center 2 that receives the response information transmitted from the vehicle 5 sets the reprogramming schedule (step S30).

(Reprogramming Schedule Setting of Corporate User)

Subsequently, an operation of the program delivery center 2 in the case of a corporate user will be described with reference to FIG. 8. Since the process illustrated in FIG. 6 is the same as in the individual user, detailed description thereof will be omitted.

Figure 8:
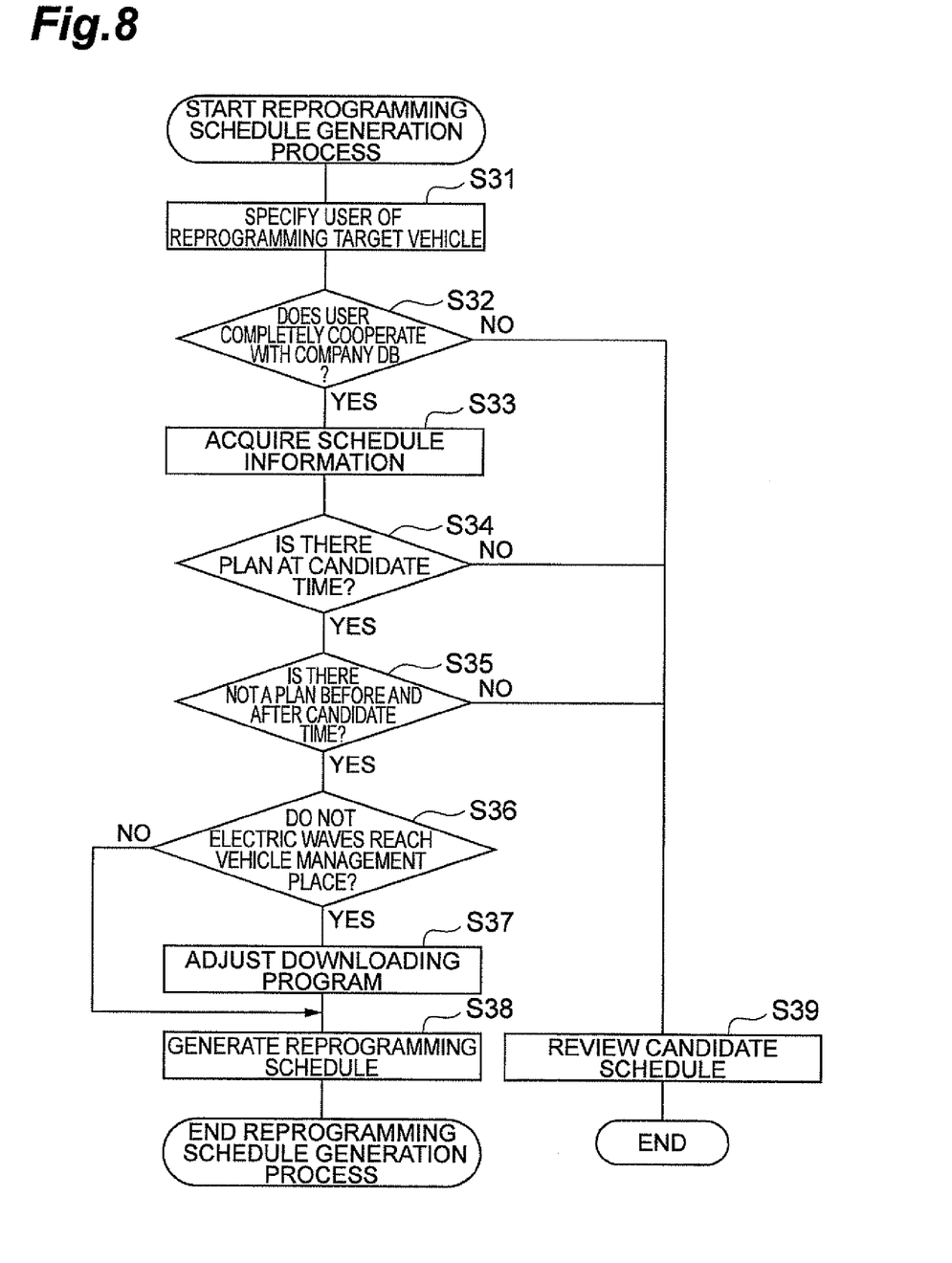
FIG. 8 is a flowchart illustrating a reprogramming schedule generation process of a corporate user.

In the reprogramming schedule generation process, as illustrated in FIG. 8, firstly, a user who owns a reprogramming schedule target vehicle is specified by the user information acquiring unit 21 (step S31). Next, it is determined by the schedule acquiring unit 23 whether a scheduler of the specified user (owner, company) has coordinated with the company DB 7 (step S32). In a case where it is determined that the scheduler of the user has coordinated with the company DB 7, the procedure proceeds to step S33. On the other hand, in a case where it is determined that the scheduler of the user does not completely cooperate with the company DB 7, the procedure proceeds to step S39.

In step S33, the schedule of the user is acquired by the schedule acquiring unit 23. Further, it is determined whether there is a plan of the user (company car usage, rental car reservation or the like) at a preset candidate time (step S34). In a case where it is determined that there is a plan of the user, the procedure proceeds to step S35. On the other hand, in a case where it is determined that there is not the user's plan, the procedure proceeds to step S39.

In step S35, it is determined by the time estimating unit 24 whether there is not a plan before and after the candidate time. In a case where it is determined that there is not a plan before and after the vehicle candidate time, the procedure proceeds to step S36. On the other hand, in a case where it is not determined that there is not a plan before and after the vehicle candidate time, the procedure proceeds to step S39.

In step S36, it is determined by the time estimating unit 24 whether a parking location of the vehicle 5 is a location which cannot be reached by electric waves. In a case where it is determined that the parking location of the vehicle 5 is the location which cannot be reached by electric waves, a downloading schedule is adjusted by the reprogramming schedule setting unit 26 (step S37). On the other hand, in a case where it is determined that the parking location of the vehicle is not the location which cannot be reached by electric waves, the procedure proceeds to step S38.

In step S38, a reprogramming schedule is generated by the reprogramming schedule generating unit 25, and then, the reprogramming schedule generation process is terminated. In step S39, a candidate schedule of the reprogramming schedule is reviewed, and then, the process of the program delivery center 2 is terminated.

Figure 9:
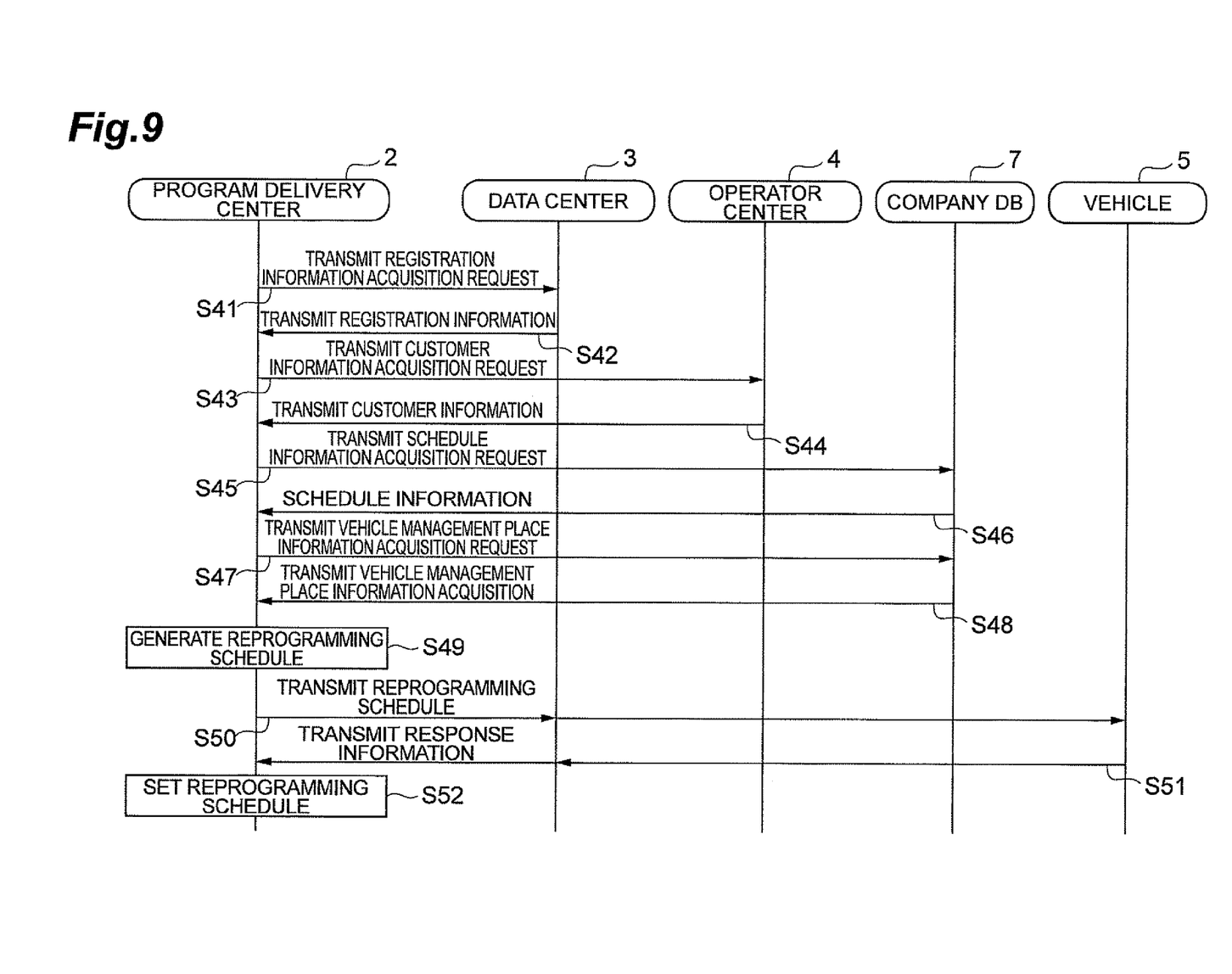
FIG. 9 is a sequence diagram illustrating a program delivery system in the case of a corporate user.

Next, an operation of the program update system 1 will be described with reference to FIG. 9. FIG. 9 is a sequence diagram illustrating the operation of the program update system.

As illustrated in FIG. 9, firstly, a registration information acquisition request is transmitted to the data center 3 from the program delivery center 2 (step S41). The data center 3 that receives the registration information request transmitted from the program delivery center 2 extracts registration information such as vehicle information with reference to the information DB 30, and transmits the registration information to the program delivery center 2 (step S42). The program delivery center 2 that receives the registration information transmitted from the data center 3 transmits a customer information acquisition request for requesting acquisition of customer information corresponding to the registration information to the operator center 4 (step S43). The operator center 4 that receives the customer information acquisition request transmitted from the program delivery center 2 extracts the customer information corresponding to the vehicle information with reference to the customer information DB 40, and transmits the customer information to the program delivery center 2 (step S44).

The program delivery center 2 that receives the customer information transmitted from the operator center 4 transmits a schedule information acquisition request for requesting acquisition of a user's schedule indicated by the customer information to the schedule DB 6 (step S45). The schedule DB 6 that receives the schedule information acquisition request transmitted from the program delivery center 2 extracts schedule information corresponding to the user, and transmits the schedule information to the program delivery center 2 (step S46).

The program delivery center 2 that receives the schedule information transmitted from the company DB 7 transmits a vehicle parking location information acquisition request for requesting acquisition of vehicle parking location information indicating the parking location of the vehicle 5 to the company DB 7 (step S47). The company DB 7 that receives the vehicle parking location information acquisition request transmitted from the program delivery center 2 extracts the parking location information of the vehicle 5, and transmits the vehicle parking location information to the program delivery center 2 (step S48).

The program delivery center 2 that receives the schedule information and the vehicle parking location information transmitted from the company DB 7 generates a reprogramming schedule (step S49), and transmits the reprogramming schedule to the vehicle 5 through the data center 3 (step S50). Vehicle 5 that receives the reprogramming schedule transmitted from the program delivery center 2 presents the reprogramming schedule to a user, and transmits response information about whether the reprogramming schedule is available to the program delivery center 2 (step S51). The program delivery center 2 that receives the response information transmitted from the vehicle 5 sets the reprogramming schedule (step S52).

As described above, the program delivery center 2 is the program update device configured to update the program of the reprogramming target ECU 54 installed in the vehicle 5, and obtains the schedule relating to the vehicle 5 by the schedule acquiring unit 23, estimates the time when the vehicle 5 is not in use on the basis of the acquired schedule by the time estimating unit 24, and generates and outputs reprogramming schedule by the reprogramming schedule generating unit 25. In this way, by acquiring the schedule relating to the vehicle 5, it is possible to estimate a time when the vehicle 5 is not in use, that is, a usage situation of the vehicle 5. Thus, it is possible to generate a reprogramming schedule based on the usage situation of the vehicle 5.

Further, the schedule is the activity plan of the user who owns the vehicle 5. In this case, by acquiring the activity plan of the user who owns the vehicle 5, it is possible to estimate a time and date (time and date to be used) when the vehicle 5 is not in use. Thus, it is possible to appropriately generate a reprogramming schedule of reprogramming of the reprogramming target ECU 54 according to a situation of the user who owns the vehicle 5.

The schedule includes the usage situation, the usage environment, and the usage plan of the vehicle 5. In this case, in a case where the vehicle 5 is managed by a corporate, for example, like a company car or a rental car, by acquiring a usage situation or a rental situation of the vehicle 5, it is possible to estimate a date and time when the vehicle 5 is not in use. Thus, it is possible to appropriately generate a reprogramming schedule of reprogramming of the reprogramming target ECU 54 according to a situation of the user who owns the vehicle 5.

The invention is not limited to the exemplary embodiments. For example, in the embodiments, the program delivery center 2, the data center 3 and the operator center 4 are respectively installed in an independent manner, but the program delivery center 2, the data center 3 and the operator center 4 may be installed in the same center. Further, a program update device (control means) may be installed on the vehicle 5.

Further, in the exemplary embodiments, the control device according to the invention is applied to reprogramming of the reprogramming target ECU 54, but may be rewriting of a program of an FPGA (Field Programmable Gate Array) that is control means. The FPGA is a gate array capable of writing a logic circuit, and is capable of rewriting (change of control content) a program of the logic circuit. In the FPGA, the program is read from a memory, to thereby realize its function.

REFERENCE SIGNS LIST

2 PROGRAM DELIVERY CENTER (CONTROL DEVICE), 5 VEHICLE, 23 SCHEDULE ACQUIRING UNIT (SCHEDULE ACQUISITION MEANS), 25 REPROGRAMMING SCHEDULE GENERATING UNIT (CHANGE DATE AND TIME GENERATION MEANS)

The invention claimed is:

1. A control device that changes control content of an electronic control unit mounted in a vehicle, comprising:
a user information acquiring unit for acquiring information on a user who owns the vehicle in which the control content should be updated;
schedule acquisition portion for acquiring a schedule that is an activity plan of the user of the vehicle, the schedule being obtained by the user information acquiring unit;
a time estimating unit for estimating a time when the vehicle is not in use on the basis of the schedule acquired by the schedule acquisition portion; and
a change date and time generation portion for generating and outputting change date and time when the control content is changed, according to the time,
wherein the schedule acquiring unit acquires the schedule from a database server on which the schedule of the user is stored, and
the time estimating unit determines whether there is a plan of the user in a preset candidate time of the changed control content, and if there is a plan in the candidate time, the time estimating unit estimates whether the time in the candidate time is the time when the vehicle is not in use.

2. The control device according to claim 1,
wherein change in the control content of the electronic control unit is acquired through an electric wave.

3. The control device according to claim 1,
wherein the schedule acquisition portion acquires the schedule from a terminal outside the vehicle.

4. The control device according to claim 1,
wherein the schedule includes at least one of a usage situation, a usage environment and a usage plan of the vehicle.

5. The control device according to claim 1, further comprising:
a time estimation portion for determining whether the vehicle is parked at a location which cannot be reached by electric waves,
wherein the time estimation portion estimates, in a case where it is determined that the vehicle is parked at the location which cannot be reached by the electric waves, a time when the vehicle is stopped at the location which cannot be reached by the electric waves from the schedule.

6. A control device that changes control content of an electronic control unit mounted in a vehicle, comprising:
a user information acquiring unit for acquiring information on a user who owns the vehicle in which the control content should be updated;
schedule acquisition unit acquiring a schedule that is an activity plan of the user of the vehicle, the schedule being obtained by the user information acquiring unit; and
a time estimating unit for estimating a time when the vehicle is not in use on the basis of the schedule acquired by the schedule acquisition unit;
a change date and time generation unit for generating and outputting change date and time when the control content is changed, according to the time,
wherein the schedule acquisition unit acquires the schedule from a database server on which the schedule of the user is stored, and
the time estimating unit determines whether there is a plan of the user in the preset candidate time of the changed control content, and if there is a plan in the candidate time, the time estimating unit estimates whether the time in the candidate time is the time when the vehicle is not in use.

7. The control device according to claim 6,
wherein change in the control content of the electronic control unit is acquired through an electric wave.

8. The control device according to claim 6,
wherein the schedule acquisition unit acquires the schedule from a terminal outside the vehicle.

9. The control device according to claim 6,
wherein the schedule includes at least one of a usage situation, a usage environment and a usage plan of the vehicle.

10. The control device according to claim 6, further comprising:
time estimation unit determining whether the vehicle is parked at a location which cannot be reached by electric waves, wherein the time estimation unit estimates, in a case where it is determined that the vehicle is parked at the location which cannot be reached by the electric waves, a time when the vehicle is stopped at the location which cannot be reached by the electric waves from the schedule.

* * * * *